Patented July 22, 1930

1,771,140

UNITED STATES PATENT OFFICE

EMIL E. NOVOTNY, OF PHILADELPHIA, PENNSYLVANIA, ASSIGNOR TO JOHN STOG-DELL STOKES, OF HUNTINGDON VALLEY POST OFFICE, PENNSYLVANIA

METHOD OF MAKING SUBSTANTIALLY ANHYDROUS FINELY-DIVIDED SYNTHETIC RESINS

No Drawing.    Application filed March 12, 1928.  Serial No. 261,190.

This invention consists of an improved method of producing relatively dry and anhydrous synthetic resinous products low in volatile constitutes from resinous bodies containing objectionable quantities of these volatile materials. Furthermore, the products may be readily washed and purified much the same as crystalline bodies due to the elimination of dense resinous masses by subdividing the material into fine particle sizes in a simple and economical mechanical manner.

This invention is particularly directed to the subdivision of the sticky, tacky resinous mass while warm by means of a spray into very fine particles of almost molecular size. The maintaining of this fine state of division while removing the volatile constituents either in a current of relatively cool air or in a spray or bath of water.

The resinous material is hard to handle in air as a very large volume is needed and it is difficult to handle large commercial batches of the resin in this way. Furthermore, the air does not completely remove some of the higher boiling volatile materials present, such as the phenols, cresols and xylenols where resinous phenolic condensation products are to be treated. Furthermore, some of the non-volatile salts or high boiling acids used as catalysts are very difficult to remove in air alone. With the fine division of particles sprayed into a rapidly changing spray or body of water these materials are readily removed.

As the molecular division of the spray nozzle treated resinous product is more or less affected by heat and tends to pack and fuse together, the sudden chilling and elimination of impurities in the water bath prevents further fusion and as the resin absorbs no moisture the resin particles are readily separated from the wash water and the surface water on the resinous particles is quickly removed and the product dried.

Various types of spray nozzles may be used, either of the single opening high pressure type or of the two nozzle atomizer type. A jet of air or steam being used to atomize the resin issuing from a tube or nozzle. Both types of spray nozzles are well known and are procurable on the open market.

I prefer the double nozzle with hot air used as the impacting body. Such nozzle air is preferably heated to about 240° F. as it has been found to produce a finer spray. This tube or nozzle may have an opening of one eighth inch diameter. The resin delivery tube or nozzle preferably has an opening of one sixteenth inch diameter and is heated to about 212° F. as is also the resin. The resin container is operated preferably while air or other gas pressure is maintained on the resinous material at a preferred pressure of about eighty pounds to the square inch. Where air drying is used the air current should have a temperature of from 100 to 110° F. and a sufficient velocity to float the subdivided particles to a suitable air separator.

Where a single nozzle is used for the spray the resinous material is fed to the nozzle at a high pressure. A pressure of one to two thousand pounds to the square inch being preferable. This is obtained by feeding the warm sludgelike resin to a double acting screw pump which readily develops this pressure because of the high viscosity of the resin. The nozzle temperature is maintained at about the temperature of a hundred pounds of steam pressure to quickly heat the resin before it issues from the spray nozzle. The sprayed resin is rapidly cooled.

An ordinary cylinder type of hydraulic pump cannot be used satisfactorily as the resin sludge carries quantities of air mixed with the resin by the stirring devices in the kettle as the usual result of stirring the product during reaction. This occluded air traps in the cylinders and these quickly become air bound and cannot function. This occluded air is desirable in the operation of a single nozzle air spray as the expansion of the air within the product performs the major function of breaking up the resin body into fine particles of molecular size when the resin issues from the nozzle and pressure is released.

The resinous subdivided particles are preferably directed into a spray or body of water to rapidly cool the resin, to prevent the particles from sticking together and to better remove the soluble and volatile materials. As most resins such as phenolic condensation products do not absorb water the drying operation is not retarded but really hastened by this washing operation. The wet resin remains hard and sandy while wet.

The subdivision of the wet, sludgelike, sticky resinous mass into fine particles and keeping the product in such fine subdivided condition until sufficiently altered to a nontacky powdered mass forms the basis of the method described herein. By this method resins of extreme reactivity may be made on a large production basis with extreme uniformity. The ease of handling of a two ton digester load of resin is so simple that no hazards are encountered and there are no losses of material because of the reaction becoming uncontrollable or because the occluded volatiles cannot be removed in time before the viscosity of the product is too high.

The method eliminates the difficulties encountered because of the mass action of a sticky product of relatively poor heat conductivity.

By my method I eliminate the difficulties encountered in the one step wet reaction and am enabled to use the same cheap wet starting materials of such process with an increase in the production and produce products which are more useful and uniform.

The two step method of resin manufacture was an improvement on the old wet one step system as the resin produced was permanently fusible and of low viscosity. The use of the subsequent hardening agent added to the resin mass is both expensive and undesirable. The hexamethylenetetramine used is expensive and cannot be added to the hot resin mass in the digester. If mixed with the ground fusible resin the mixture separates in time, causing endless troubles from lack of uniformity. To produce a fairly uniform composition the resin and hardening agent must be ground together for a number of hours in a ball mill, a dusty noncontinuous operation. The liberation of the large quantities of ammonia during reaction makes the use of hexamethylenetetramine impossible for certain purposes where the electrical requirements are high. The product is useless for lacquers either alone or in cellulose compounds as the resin is not tough and if reacted to combine with the hexamethylenetetramine bubbles are formed on the surface if cured at atmospheric pressure. The hexamethylenetetramine constantly reduces the viscosity of the nitrocellulose solutions. This is a desirable attribute when and if wanted as where high viscosity cellulose is used but it is difficult to stabilize and maintain the desired viscosity.

The one step dry reaction eliminates many of the difficulties of the preceding methods but it is expensive and it is difficult to produce a product of low viscosity and free from large amounts of ammonia liberated by the hexamethylenetetramine used. The reaction is essentially conducted in an ammonia system instead of water and therefore several of the objections to the wet one step method remain.

The resinous product made by my method impregnates paper and fillers well without the use of solvents or differential rolls. Therefore laminated sheet, tube and gear products can be made without the use of solvents.

As a lacquer or lacquer or varnish ingredient the product adheres well to the support, has a hard surface and is very soluble in the solvents used. When heated there is produced a fine polished film free from bubbles and of uniform transparency.

While the method is directed chiefly to the production of resinous masses from phenols and formaldehyde, other phenolic bodies or homologues may be used such as the cresols, naphthols, resorcinol and xylenols. In place of formaldehyde other bodies having active methylene groups, other aldehydes and their derivatives and other resin producing bodies such as the carbohydrates, starches, sugars and higher alcohols such as glycerine may be used in the production of useful resins by my method.

The "glyptal" resins made by combining polyhydric alcohols such as glycerine with suitable polybasic acids such as phthalic anhydrid, etc., likewise, the various urea resins as for example those made from urea and formaldehyde may be advantageously processed by my method to produce resins and plastic moldable masses free from bubbles and other faults.

As the many formulæ now published and known can be used in my process it is not necessary to give detailed examples of these as the method clearly specifies the handling of the resinous masses made by any well known method. The addition of various solvents, colors, dyes, plasticizers, modifiers, accelerators, hardening agents, fillers or extending materials may be made before, during or after the reaction and treatment herein described. Such additions are preferably made after the resin has been carried through my process and the undesired volatile constituents have been eliminated.

In its dry soluble form it is best suited for use in varnishes and cellulose lacquers.

What I claim is—

1. In the production of synthetic resins relatively low in volatile constituents the step which comprises dividing the resinous body into fine particles and washing said particles in water to remove substantial quantities of volatile constituents from the particles and preventing their fusion into large homogeneous bodies.

2. In the production of synthetic resins relatively low in volatile constituents the step which comprises dividing the resinous body into fine particles and forcing the same into a body of water to remove from said resinous particles substantial quantities of volatile constituents and simultaneously preventing the fusion of the resinous particles into large homogeneous bodies.

3. In the production of synthetic resins relatively low in volatile constituents the step which comprises dividing the resinous body into fine sprayed particles, quickly wetting the particles, removing volatile constituents therefrom while maintaining the sprayed material in a state of subdivision, and subsequently separating the resinous particles from the water.

4. In the production of synthetic resins relatively low in volatile constituents the step which comprises dividing the resinous body into fine sprayed particles, quickly wetting the particles, removing volatile constituents therefrom while maintaining the sprayed material in a state of subdivision and subsequently separating the resinous particles from the water and drying the product.

5. In the production of phenolic condensation resinous products relatively low in volatile constituents the step which comprises dividing the resinous body while warm into fine particles and subsequently wetting and washing said particles to remove volatile constituents and subsequently drying said resinous product.

Signed at Philadelphia, in the county of Philadelphia and State of Pennsylvania, this ninth day of March, A. D. 1928.

EMIL E. NOVOTNY.